(12) United States Patent
Shiraishi

(10) Patent No.: US 6,769,039 B2
(45) Date of Patent: Jul. 27, 2004

(54) DATA PROCESSING APPARATUS WITH CIRCUIT FOR CONFIRMING NORMALITY OF SERIAL TRANSMISSION DATA

(75) Inventor: Hidetoshi Shiraishi, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 109 days.

(21) Appl. No.: 10/159,500

(22) Filed: May 31, 2002

(65) Prior Publication Data

US 2002/0184599 A1 Dec. 5, 2002

(30) Foreign Application Priority Data

Jun. 1, 2001 (JP) ....................................... 2001-166883

(51) Int. Cl.[7] .............................................. G06F 5/00
(52) U.S. Cl. ......................................... 710/52; 710/65
(58) Field of Search .............................. 710/52–57, 71, 710/65, 58, 60, 61

(56) References Cited

U.S. PATENT DOCUMENTS

| | | | |
|---|---|---|---|
| 4,063,220 A | 12/1977 | Metcalfe et al. | |
| 4,234,926 A | 11/1980 | Wallace et al. | |
| 5,566,193 A | * 10/1996 | Cloonan | 371/49 |
| 5,737,522 A | * 4/1998 | Matsumoto | 395/185 |
| 5,903,581 A | * 5/1999 | Imazu | 371/37 |
| 5,964,845 A | * 10/1999 | Braun | 709/400 |
| 6,081,570 A | * 6/2000 | Ghuman et al. | 375/368 |
| 6,202,108 B1 | * 3/2001 | Autechaud et al. | 710/61 |

FOREIGN PATENT DOCUMENTS

JP  02-274031  11/1990  ............. H04L/1/18

* cited by examiner

*Primary Examiner*—Fritz Fleming
*Assistant Examiner*—Alan Chen
(74) *Attorney, Agent, or Firm*—Scully, Scott, Murphy & Presser

(57) ABSTRACT

A data processing apparatus has a single serial port, a data transmitting circuit, an output buffer circuit, and a data comparing circuit, and transmits serial data to an external data processing terminal. Serial data to be serially transmitted which is successively generated by the data transmitting circuit is buffered by the output buffering circuit, and serially transmitted from the serial port to the data processing terminal. The data comparing circuit confirms whether serial data transmitted from the data transmitting circuit to the output buffer circuit and serial data transmitted from the output buffer circuit to the serial port agree with each other or not. For example, if a data error occurs in serial data serially transmitted from the data processing apparatus to the data processing terminal due to noise introduced into the serial port, then the data comparing circuit detects that the serial data transmitted from the output buffer circuit to the serial port differs from the serial data transmitted from the data transmitting circuit to the output buffer circuit.

5 Claims, 2 Drawing Sheets

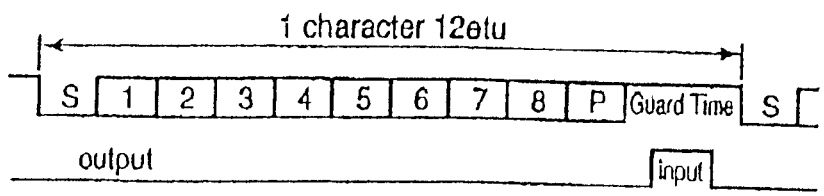
Fig. 3a
Fig. 3b
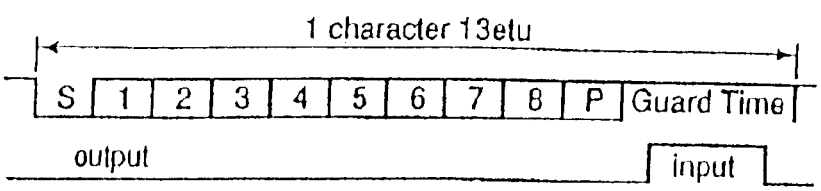
Fig. 4a
Fig. 4b
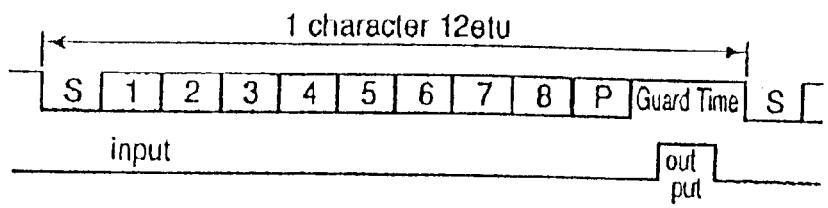
Fig. 5a
Fig. 5b
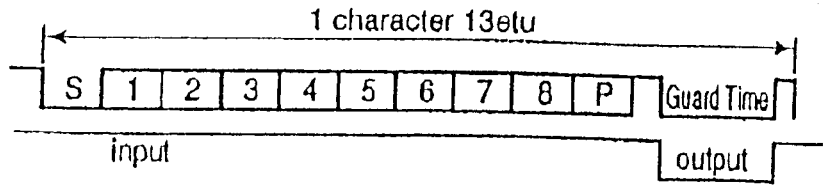
Fig. 6a
Fig. 6b

DATA PROCESSING APPARATUS WITH CIRCUIT FOR CONFIRMING NORMALITY OF SERIAL TRANSMISSION DATA

BACKGROUND OF THE INVENTION

1. Field of the Invention

The present invention relates to a data processing apparatus for transmitting serial data to, or transmitting serial data to and receiving serial data from, an external data processing terminal.

2. Description of the Related Art

One data processing apparatus which is available at present performs data communication with external data processing terminals. According to a form of data communication, the data processing apparatus carries out both serial data transmission and serial data reception through one serial port.

However, when noise is input from an external source to the serial port, serial data transmitted from the data processing apparatus to a data processing terminal may suffer a data error. Therefore, it is necessary to confirm the abnormality of serial data that is transmitted in a serial data transmission mode.

For example, a data processing system disclosed in Japanese laid-open patent publication No. 02-274031 includes a data processing apparatus and a data processing terminal each having serial ports dedicated to data transmission and data reception, respectively. The data processing terminal returns received data to the data processing apparatus, which compares the transmitted data with the returned data to confirm the normality of the data transmission.

With the data processing apparatus which carries out both serial data transmission and serial data reception through one serial port, if the data processing terminal successively holds serial data received serially through the serial port, and returns the received data to the data processing apparatus after the serial reception is finished, then the data processing apparatus can compare the transmitted data and the returned data with each other. However, since the data processing apparatus receives, through the single serial port, the serial data by way of serial reception which has been transmitted by way of serial transmission, the data processing apparatus is unable to confirm the normality of the data transmission on a real-time basis, and has its communication rate reduced to one half.

When the data processing apparatus compares the transmitted data and the returned data from the data processing terminal with each other, even if the data processing apparatus determines that the transmitted data and the returned data do not agree with each other, it cannot confirm whether the data error has occurred during the transmission of the data to the data processing terminal or during the return of the data from the data processing terminal.

SUMMARY OF THE INVENTION

It is an object of the present invention to provide a data processing apparatus which is capable of confirming, on a real-time basis, that the serial transmission of serial data from one serial port thereof to a data processing terminal is performed normally.

According to a first aspect of the present invention, a data processing apparatus has a single serial port, a data transmitting means, an output buffer means, and a data comparing circuit, and transmits serial data to an external data processing terminal.

The data transmitting means successively generates serial data to be serially transmitted. The successively generated serial data is buffered by the output buffer means, and then serially transmitted from the serial port to the data processing terminal. When the data processing apparatus thus serially transmits serial data to the data processing terminal, the data comparing means confirms whether serial data transmitted from the data transmitting means to the output buffer means and serial data transmitted from the output buffer means to the serial port agree with each other or not. For example, if a data error occurs in serial data serially transmitted from the data processing apparatus to the data processing terminal due to noise introduced into the serial port, then the data comparing means detects that the serial data transmitted from the output buffer means to the serial port differs from the serial data transmitted from the data transmitting circuit to the output buffer circuit.

According to a second aspect of the present invention, a data processing apparatus has a single serial port, a data receiving means, a data transmitting means, an output buffer means, a buffer bypass path, a connection switching means, and a data comparing means, and performs serial communication of serial data bidirectionally with an external data processing terminal.

For performing serial reception, the connection switching means connects the buffer bypass path and the data receiving means to each other, and the data receiving means successively acquires serial data serially received through the serial port from the buffer bypass path. The data processing apparatus thus serially receives serial data from the data processing terminal. For performing serial transmission, the connection switching means connects the data transmitting means to the output buffer means, and the data transmitting means successively generates serial data to be serially transmitted. The successively generated serial data is buffered by the output buffer means, and then serially transmitted from the serial port to the data processing terminal. The data processing terminal thus serially receives serial data from the data processing apparatus.

When the data processing apparatus serially transmits serial data to the data processing terminal, the data comparing means confirms whether serial data transmitted from the data transmitting means to the output buffer means and serial data transmitted from the output buffer means to the serial port agree with each other or not. For example, if a data error occurs in serial data serially transmitted from the data processing apparatus to the data processing terminal due to a conflict between serial data transmitted between the data processing apparatus and the data processing terminal, then the data comparing means detects that the serial data transmitted from the output buffer means to the serial port differs from the serial data transmitted from the data transmitting means to the output buffer means.

The above and other objects, features, and advantages of the present invention will become apparent from the following description with reference to the accompanying drawings which illustrate examples of the present invention.

BRIEF DESCRIPTION OF THE DRAWINGS

FIG. 3 is a timing chart showing no parity error occurring at a transmission timing according to T=0 protocol;

FIG. 4 is a timing chart showing a parity error occurring at a transmission timing;

FIG. 5 is a timing chart showing no parity error occurring at a reception timing; and FIG. 6 is a timing chart showing a parity error occurring at a reception timing.

EXPLANATION OF THE PREFERRED EMBODIMENTS

Figure 1:
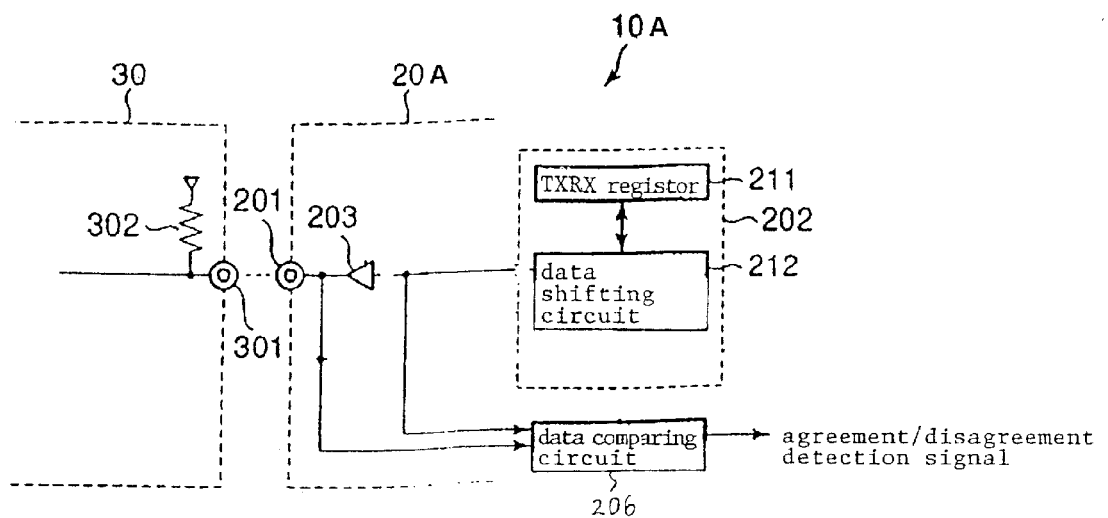
FIG. 1 is a block diagram of a central portion of a data processing apparatus according to a first embodiment of the present invention.

As shown in FIG. 1, data processing system 10A according to a first embodiment of the present invention has data processing apparatus 20A and data processing terminal 30.

Data processing apparatus 20A and data processing terminal 30 have respective serial ports 201, 301 and are constructed such that they can detachably be connected to each other. When data processing terminal 30 is connected to data processing apparatus 20A, their serial ports 201, 301 are connected to each other. Data processing terminal 30 has pull-up resistor 302 and data processing circuit (not shown). Data processing apparatus 20A serially transmits serial data from serial port 201 to data processing terminal 30.

Data processing apparatus 20A has, in addition to serial port 201, data communication circuit 202, output buffer circuit 203, and data comparing circuit 206. Data communication circuit 202 has TXRX register 211 and data shifting circuit 212.

TXRX register 211 stores transmission data and outputs the transmission data as parallel data to data shifting circuit 212. Data shifting circuit 212 receives the transmission data output as parallel data from TXRX register 211, and outputs the received transmission data as serial data. In this manner, data communication circuit 202 successively generates serial data to be transmitted serially from serial port 201.

Output buffer circuit 203 buffers serial data successively transmitted from data communication circuit 202 to serial port 201.

When serial data is serially transmitted from serial port 202, data comparing circuit 206 compares serial data transmitted from data communication circuit 202 to output buffer circuit 203 and serial data transmitted from output buffer circuit 203 to serial port 201 with each other, and detects whether the compared serial data agree with each other or not.

Figure 2:
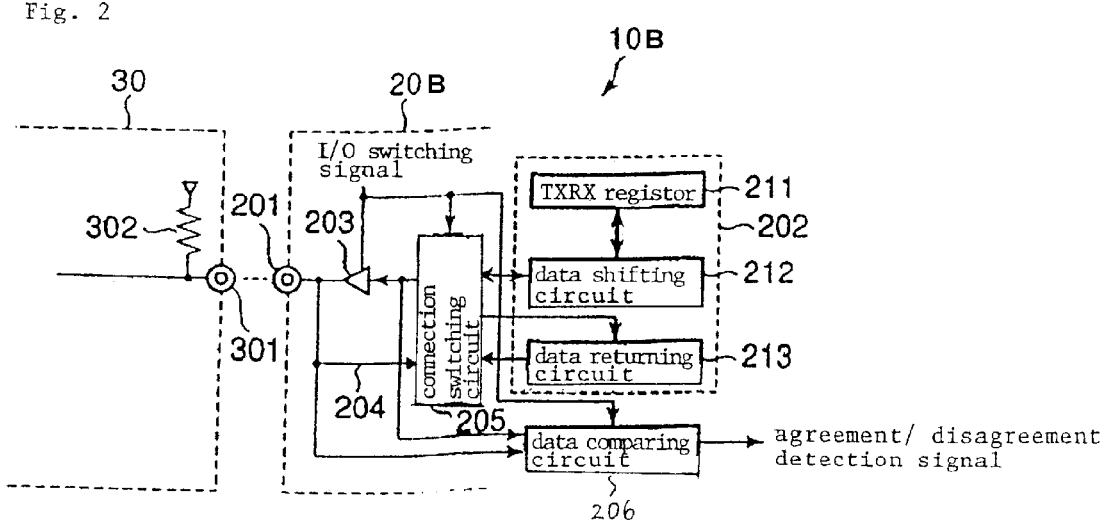
FIG. 2 is a block diagram of a central portion of a data processing apparatus according to a second embodiment of the present invention.

As shown in FIG. 2, data processing system 10B according to a second embodiment of the present invention has data processing apparatus 20B and data processing terminal 30.

Data processing apparatus 20B and data processing terminal 30 have respective serial ports 201, 301 and are constructed such that they can detachably be connected to each other. When data processing terminal 30 is connected to data processing apparatus 20B, their serial ports 201, 301 are connected to each other. Data processing terminal 30 has pull-up resistor 302 and data processing circuit (not shown). Data processing terminal 30 serially transfers serial data according to T=0 protocol bidirectionally to and from data processing apparatus 20B.

Data processing apparatus 20B has, in addition to serial port 201, data communication circuit 202, output buffer circuit 203, buffer bypass path 204, connection switching circuit 205 and data comparing circuit 206. Data communication circuit 202 has TXRX register 211, data shifting circuit 212, and data returning circuit 213.

Serial port 201 of data processing circuit 20B serially transmits serial data to serial port 301 of data processing terminal 30, and serially receives serial data from serial port 301 of data processing terminal 30. Data communication circuit 202 successively generates serial data to be transmitted serially from serial port 201, and receives serial data through serial port 201.

TXRX register 211 stores transmission data and outputs the transmission data as parallel data to data shifting circuit 212. Data shifting circuit 212 receives the transmission data output as parallel data from TXRX register 211, and outputs the received transmission data as serial data. In this manner, data communication circuit 202 successively generates serial data to be transmitted serially from serial port 201.

Data shifting circuit 212 outputs serial data input from serial port 201 as parallel data to TXRX register 211, and TXRX register 211 successively acquires the received data output as parallel data. In this manner, data communication circuit 202 successively acquires serial data input from serial port 201.

Output buffer circuit 203 buffers serial data successively transmitted from data communication circuit 202 through connection switching circuit 205 to serial port 201. Buffer bypass path 204 successively transmits the serial data input from serial port 201 through connection switching circuit 205 to data communication circuit 202.

Depending on the logic level of an I/O (Input/Output) switching signal input from an external circuit, connection switching circuit 205 connects data communication circuit 202 to output buffer circuit 203 at a transmission timing and connects buffer bypass path 204 to data communication circuit 202 at a reception timing.

When serial data is serially transmitted from serial port 201, data comparing circuit 206 compares serial data transmitted from data communication circuit 202 to output buffer circuit 203 and serial data transmitted from output buffer circuit 203 to serial port 201 with each other, and detects whether the compared serial data agree with each other or not.

As shown in FIGS. 2 through 6, since data processing circuit 20B and data processing terminal 30 performs serial data communication of serial data according to the T=0 protocol, when one character is serially transmitted, status data in a receptive state only during a guard time is serially received.

Data returning circuit 213 generates status data in a receptive state corresponding to the serial data according to the T=0 protocol which is serially input to serial port 201, and connection switching circuit 205 connects buffer bypass path 204 to data communication circuit 202 at the reception timing of the T=0 protocol. In a guard time included as a transmission timing in the reception timing, connection switching circuit 205 connects data communication circuit 202 to output buffer circuit 203.

Similarly, data comparing circuit 206 confirms the agreement of serial data serially transmitted at the transmission timing. In the guard time included in the reception timing of the T=0 protocol, data comparing circuit 206 confirms the agreement between status data serially transmitted from data communication circuit 202 to output buffer circuit 203 and state data serially transmitted from output buffer circuit 203 to serial port 201.

In a guard time included as a reception timing in the transmission timing of the T=0 protocol, connection switching circuit 205 connects buffer bypass pass 204 to data communication circuit 202, and data comparing circuit 206 does not confirm the agreement between the transmission data between data communication circuit 202 and output buffer circuit 203 and the transmission data between output buffer circuit 203 and serial port 201.

With data processing system 10B, data processing apparatus 20B is carried by a general user, and data processing terminal 30 is installed in a certain position such as a shop or the like. When the general user connects data processing apparatus 20B to data processing terminal 30, data processing terminal 30 and data processing apparatus 20B perform bidirectional communication of various data therebetween.

At this time, because data processing apparatus 20B and data processing terminal 30 perform serial communication of serial data between serial ports 201 and 301 according to the T=0 protocol, the direction of the serial communication is switched alternately at timings prescribed by the T=0 protocol.

When serial data is serially transmitted from data processing apparatus 20B to data processing terminal 30, connection switching terminal 205 connects data communication circuit 202 and output buffer circuit 203, and data communication circuit 202 successively generates serial data to be serially transmitted. The successively generated serial data is buffered by output buffer circuit 203, and then serially transmitted from serial port 201 to data processing terminal 30. Data processing terminal 30 thus serially receives the serial data from data processing apparatus 20B.

When data processing apparatus 20B thus serially transmits serial data to data processing terminal 30, data comparing circuit 206 confirms the agreement between serial data transmitted from data communication circuit 202 to output buffer circuit 203 and serial data transmitted from output buffer circuit 203 to serial port 201.

When data processing apparatus 20B serially receives serial data from data processing terminal 30, connection switching circuit 205 connects buffer bypass pass 204 and data communication circuit 202 to each other. Data communication circuit 202 successively acquires serial data input from serial port 201. In this manner, data processing apparatus 20B serially receives serial data from data processing terminal 30.

When data processing apparatus 20B serially receives serial data from data processing terminal 30, status data in a receptive state is serially transmitted from data processing apparatus 20B to data processing terminal 30 in the guard time of the T=0 protocol.

In the guard time of the T=0 protocol, therefore, data comparing circuit 206 confirms the agreement between status data serially transmitted from data communication circuit 202 to output buffer circuit 203 and status data serially transmitted from output buffer circuit 203 to serial port 201.

Since data processing apparatus 20 and data processing terminal 30 performs serial communication by alternately switching the direction of communication, serial data transmitted between data processing apparatus 20 and data processing terminal 30 may possibly be brought into conflict with each other. When serial data is serially transmitted from data processing apparatus 20 to data processing terminal 30, noise may possibly be forcibly input from an external source to serial ports 201, 301.

With data processing system 10B, however, because data processing apparatus 20B confirms whether serial data to be serially transmitted to data processing terminal 30 remains the same across output buffer pass 204 or not, it is possible to detect a data error of the serial data which is transmitted from data processing apparatus 20B through serial port 201.

If a conflict occurs between serial data from data processing apparatus 20B and data processing terminal 30 or noise is introduced into serial data to be serially transmitted, then data processing apparatus 20B can detect such a conflict or noise as a disagreement of transmission data. Therefore, data processing system 10B is prevented from malfunctioning due to a conflict between serial data or noise forcibly introduced into serial data.

Furthermore, since data processing system 10B performs serial communication according to the T=0 protocol, data processing apparatus 30B can confirm that no data error occurs in status data in a receptive state in the guard time which is returned depending on serial data according to the T=0 protocol which is serially received from data processing terminal 30.

In the above embodiment, a data error in transmission data is detected only by data processing apparatus 20B. However, a data error in transmission data may be detected by data processing terminal 30.

In the above embodiments, serial ports 201, 301 of data processing apparatus 20A, 20B and data processing terminals 30 can detachably be connected to each other. However, serial ports 201, 301 of data processing apparatus 20B and data processing terminals 30 may permanently be connected to each other.

While preferred embodiments of the present invention have been described using specific terms, such description is for illustrative purposes only, and it is to be understood that changes and variations may be made without departing from the spirit or scope of the following claims.

What is claimed is:

1. A data processing apparatus for serially transmitting serial data to an external data processing terminal, said apparatus comprising:

a single serial port;

data transmitting means for successively generating serial data to be serially transmitted from said serial port;

output buffer means for buffering serial data successively generated by said data transmitting means and successively transmitting the serial data to said serial port; and data comparing means for confirming whether serial data transmitted from said data transmitting means to said output buffer means and serial data transmitted from said output buffer means to said serial port agree with each other or not.

2. A data processing apparatus for performing serial communication of serial data bidirectionally with an external data processing terminal, said apparatus comprising:

a single serial port;

data receiving means for successively receiving serial data input from said serial port;

data transmitting means for successively generating serial data to be serially transmitted from said serial port;

output buffer means for buffering serial data successively generated by said data transmitting means and successively transmitting the serial data to said serial port;

a buffer bypass path connected to said serial port parallel to said output buffer means;

connection switching means for selectively connecting said data transmitting means to said output buffer means and connecting said buffer bypass path to said data receiving means; and data comparing means for confirming whether serial data transmitted from said data transmitting means to said output buffer means and serial data transmitted from said output buffer means to said serial port agree with each other or not.

3. A data processing apparatus according to claim 2, wherein said data receiving means and said data transmitting means comprise single data transmitting means for successively acquiring serial data through said serial port and successively generating serial data to be serially transmitted, and said connection switching means selectively connects said output buffer means and said buffer bypass path to said data transmitting means.

4. A data processing apparatus according to claim 2, wherein said data transmitting means generates returning serial data depending on said serial data serially received through said serial port, and said data comparing means confirms whether said returning serial data agrees with the received serial data.

5. A data processing apparatus according to claim 2, wherein said serial port serially receives said serial data according to T=0 protocol, said data transmitting means generates status data in a receptive state depending on said serial data serially received through said serial port, said connection switching means connects said output buffer means and said data transmitting means to each other in a guard time of said T=0 protocol of the serial data serially received through said serial port, and said data comparing means confirms whether said status data agrees in the guard time of said T=0 protocol.

* * * * *